United States Patent Office 3,012,031
Patented Dec. 5, 1961

3,012,031
ANTHRAQUINONE OXADIAZINES
William L. Berry, Neshanic, and William L. Mosby, North Plainfield, N.J., assignors to American Cyanamid Company, New York, N.Y., a corporation of Maine
No Drawing. Filed Oct. 12, 1959, Ser. No. 845,626
6 Claims. (Cl. 260—244)

This invention relates to new anthraquinone oxadiazines of the structure

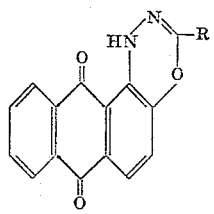

in which R may be phenyl, chlorophenyl, bromophenyl, tolyl, alkoxyphenyl, nitrophenyl, aminophenyl, acylaminophenyl, naphthyl, 2-anthraquinonyl or 1-amino-2-anthraquinonyl. These new compounds are useful as vat dyes and vat pigments.

We have found that when a 1-chloro-2-nitro-anthraquinone is reacted with an aroyl hydrazide of the formula

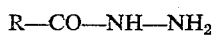
R—CO—NH—NH$_2$ the resultant intermediate compound of the structure

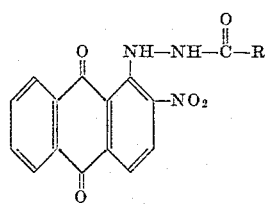

which is a further embodiment of our invention can be reacted with a caustic to give an oxidiazine of the structure

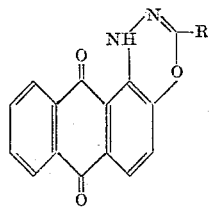

The oxadiazines thus formed represent a new class of vat dyes and vat pigments.

The aroyl hydrazides, which may be used to form the compounds of our invention, include benzhydrazide, chlorbenzhydrazide, brombenzhydrazide, toluoyl hydrazide, 2-methoxybenzhydrazide, 4-ethoxybenzhydrazide, 4-butoxybenzhydrazide, 3-nitrobenzhydrazide, 2-naphthoylhydrazide, anthraquinoylhydrazide and 1-amino-2-anthraquinonylhydrazide. When these are reacted with chloronitroanthraquinone in a solvent such as amyl alcohol, the intermediate nitrohydrazinoanthraquinone is obtained. This intermediate is then heated with a caustic such as potassium hydroxide in a solvent such as methoxyethanol. The caustic attacks the nitro group replacing it with an OH which immediately ringcloses to form the oxadiazine with the elimination of water. When nitrobenzhydrazide was used as a starting material, the resulting nitrophenyloxadiazine can be reduced to the amino compound and the amino group can be acylated by organic acyl groups such as acetyl, propionyl, benzoyl, and the like.

These oxadiazines of our invention are new vat dyes of deep shades, ranging from purples to reddish blacks. The compounds having the anthraquinonyl groups are the most deeply colored. They are usable as vat dyes to obtain deep shades or as pigments for the coloration of resins and hydrocarbons such as gasoline or candle waxes.

Our invention can be illustrated by the following examples in which parts are by weight unless otherwise specified.

Example 1

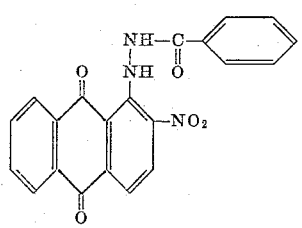

A mixture of 28.8 parts of 1-chloro-2-nitroanthraquinone, 16 parts of benzhydrazide, 1500 parts of amyl alcohol is stirred at reflux until the reaction is substantially complete. The mixture is cooled and filtered. The brown product may be purified by recrystallization from acetic acid.

When equivalent quantities of 2-chlorobenzhydrazide, 4-bromobenzhydrazide, paratoluoylhydrazide, 2-methoxybenzhydrazide, 3-nitrobenzhydrazide or 2-naphthoylhydrazide is used in place of the benzhydrazide, a similar product is obtained.

Example 2

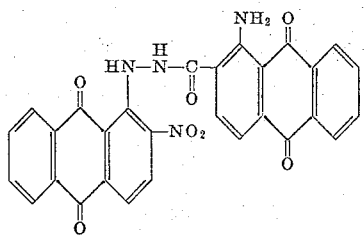

A mixture of 21 parts of 1-chloro-2-nitro-anthraquinone, 20 parts of 1-aminoanthraquinone-2-carbo-hydrazide and 1500 parts of dry ortho-dichlorobenzene is stirred at 160° C. until the reaction is substantially complete. The reaction mixture is cooled and the product which separated is isolated by filtration. It is a dull red solid.

When anthraquinonyl-2-carbohydrazide is used in place of the 1-aminoanthraquinonyl-2-hydrazide the similar product lacking the amino group is obtained.

Example 3

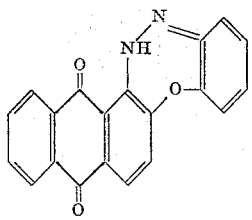

A slurry of 1500 parts of the product of Example 1 in 600 parts of 2-methoxy ethanol containing 5 parts of potassium hydroxide is stirred at 80° C. until the reaction is substantially complete. It is then drowned in water and the separated solid is filtered. The deep red product may be purified by recrystallization from acetic acid to give a purple dyestuff.

Similarly, the other substituted products of Example 1 may be treated with potassium hydroxide in the same way to effect the ring closure.

When nitrobenzhydrazide is used in the procedure of Example 1, the nitrophenyl oxadiazine resulting from the above procedure can be used per se or it can be reduced by the following procedure. The nitrophenyl compound is added slowly to an excess of 10% Na₂S aqueous solution at the boil. The mixture is then cooled, filtered, washed and dried. The resulting aminophenyl oxadiazine can be acylated in nitrobenzene solution by organic carboxy chlorides such as acetyl chloride, benzoyl chloride, or m-trifluoromethyl benzyl chloride to give the corresponding acylaminophenyl oxadiazine.

*Example 4*

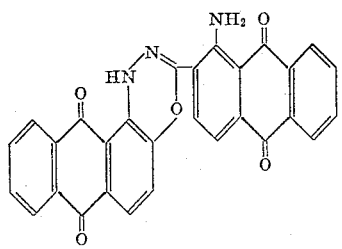

The procedure of Example 3 is followed using, in place of the product of Example 1, an equivalent quantity of the product of Example 2. A reddish-black product which dyes cotton a reddish-black shade from a yellow-brown vat is obtained.

*Example 5*

Five parts of the product of Example 4 is milled with 100 parts of polyvinylchloride, 50 parts of di-2-ethylhexyl phthalate, 2 parts of barium cadmium laurate and 1 part of a triaryl phosphate. The composition is molded in the standard way to yield a dark reddish-black colored polyvinyl chloride.

We claim:
1. A compound of the structure

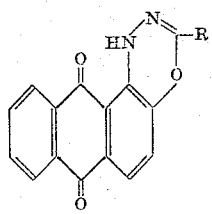

in which R is selected from the group consisting of phenyl, chlorophenyl, bromophenyl, propylphenyl, alkoxyphenyl, wherein the alkoxy moiety contains 1-4 carbon atoms, nitrophenyl, aminophenyl, acetamidophenyl, propionamidophenyl, benzamidophenyl trifluoromethylbenzamidophenyl tolyl, 2-naphthyl, 2-anthraquinonyl and 1-amino-2-anthraquinonyl.

2. The compound of the formula

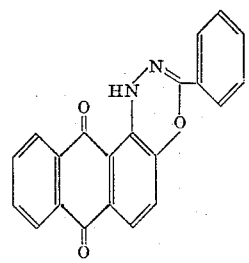

3. The compound of the formula

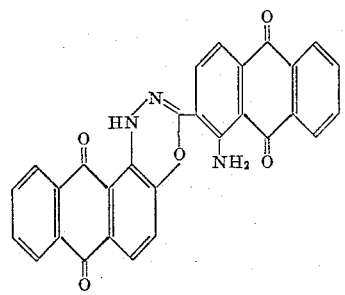

4. A compound of the structure

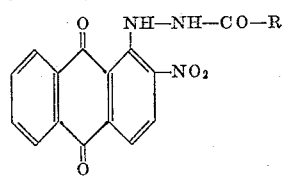

in which R is selected from the consisting of chlorophenyl, bromophenyl, propylphenyl, alkoxyphenyl, wherein the alkoxy moiety contains 1-4 carbon atoms, nitrophenyl, aminophenyl, acetamidophenyl, propionamidophenyl, benzamidophenyl, trifluoromethylbenzamidophenyl tolyl, 2-naphthyl, 2-anthraquinonyl, and 1-amino-2-anthraquinonyl.

5. The compound of the formula

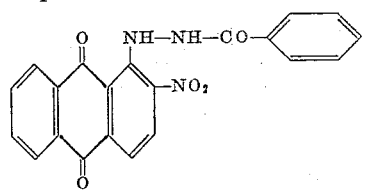

6. The compound of the formula

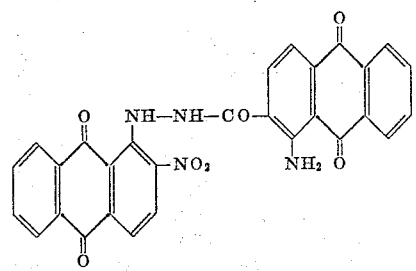

References Cited in the file of this patent
FOREIGN PATENTS
720,795     Great Britain _____ Dec. 29, 1954